United States Patent
Alacoque

(10) Patent No.: US 8,531,544 B2
(45) Date of Patent: Sep. 10, 2013

(54) METHOD FOR BLOCK-ENCODING OF A RASTER IMAGE OF PIXELS, CORRESPONDING COMPUTER PROGRAM AND IMAGE CAPTURE DEVICE

(75) Inventor: Laurent Alacoque, Voreppe (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 258 days.

(21) Appl. No.: 13/057,860

(22) PCT Filed: Sep. 4, 2009

(86) PCT No.: PCT/FR2009/051677
§ 371 (c)(1),
(2), (4) Date: Feb. 7, 2011

(87) PCT Pub. No.: WO2010/026350
PCT Pub. Date: Mar. 11, 2010

(65) Prior Publication Data
US 2011/0141310 A1 Jun. 16, 2011

(30) Foreign Application Priority Data
Sep. 5, 2008 (FR) ..................... 08 04892

(51) Int. Cl.
*H04N 5/228* (2006.01)
(52) U.S. Cl.
USPC ............... 348/222.1; 382/232; 382/248
(58) Field of Classification Search
USPC .................. 348/222.1; 382/232, 248
See application file for complete search history.

(56) References Cited

U.S. PATENT DOCUMENTS

| | | | |
|---|---|---|---|
| 5,949,912 A * | 9/1999 | Wu ........................ 382/246 |
| 2004/0136602 A1 | 7/2004 | Nagaraj et al. | |
| 2004/0218825 A1 | 11/2004 | Graffagnino | |
| 2006/0245655 A1 | 11/2006 | Suino et al. | |
| 2006/0291564 A1 | 12/2006 | Marquant et al. | |

FOREIGN PATENT DOCUMENTS

| | | |
|---|---|---|
| EP | 0 817 494 | 1/1998 |
| EP | 1 737 241 | 12/2006 |

OTHER PUBLICATIONS

International Search Report issued Dec. 8, 2009 in PCT/FR09/51677 Filed Sep. 4, 2009.

\* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

A method of block-encoding a raster image by successive two-dimensional decompositions of blocks of the image in a base of functions using a combined application of a one-dimensional kernel of vertical decomposition of n pixels and of a one-dimensional kernel of horizontal decomposition of p pixels. In the method the horizontal dimension P of each block is determined as a multiple of p, P=k·p, and a decomposition at $\log_p(P)$ level(s) of resolution is accomplished using the horizontal decomposition kernel, and the vertical dimension N of each block is determined as a multiple of n, N=l·n, and a decomposition at $\log_p(N)$ level(s) of resolution is accomplished using the vertical decomposition kernel. For given values of n and p, the values of k and l are chosen such that the vertical dimension N is strictly less than the horizontal dimension P.

10 Claims, 4 Drawing Sheets

Figure 1:
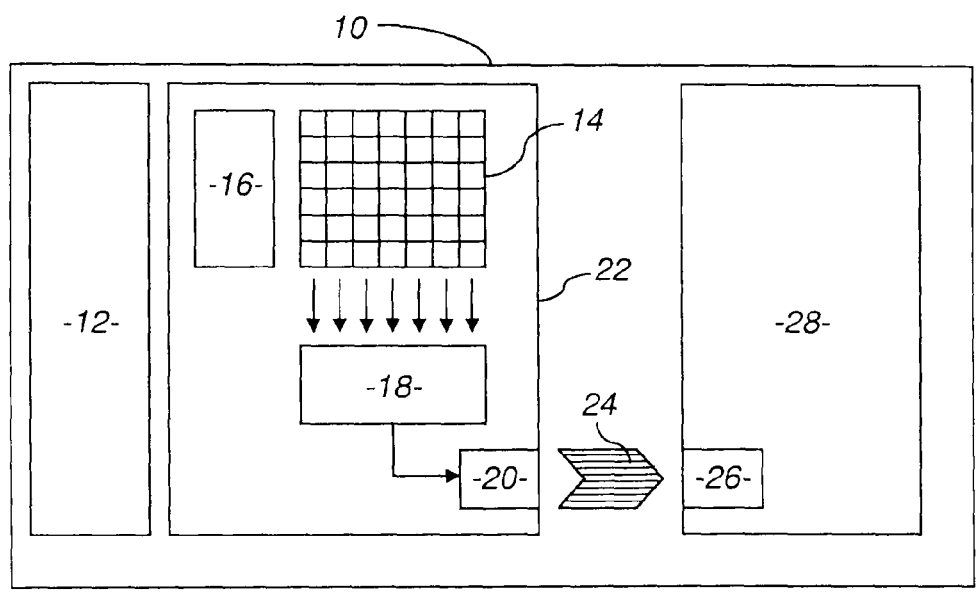

METHOD FOR BLOCK-ENCODING OF A RASTER IMAGE OF PIXELS, CORRESPONDING COMPUTER PROGRAM AND IMAGE CAPTURE DEVICE

The present invention concerns a method for block-encoding of a raster image of pixels. It also concerns a computer program comprising program code instructions and a device for capturing images designed to execute the steps of such an encoding method.

More specifically, the invention concerns a method for block-encoding of an image consisting of multiple separate blocks, by successive two-dimensional decompositions of the blocks of this image in a base of discrete functions predetermined using a combined application of a one-dimensional kernel for vertical decomposition of n pixels and of a one-dimensional kernel for horizontal decomposition of p pixels, where the horizontal direction of the blocks is defined as being that of the lines of the raster image in a line-by-line sequential read mode and/or transmission mode of the raster image, wherein:

the horizontal dimension P as a number of pixels of each block is determined as being a multiple of p, P=k·p, and a decomposition at $\log_p(P)$ level(s) of resolution is accomplished using the one-dimensional horizontal decomposition kernel, and the vertical dimension N as a number of pixels of each block is determined as being a multiple of n, N=l·n, and a decomposition at $\log_n(N)$ level(s) of resolution is accomplished using the one-dimensional vertical decomposition kernel.

A "kernel" has the traditional meaning of a discrete elementary function on the basis of which is constructed the said predetermined base of discrete functions, notably by expansions (frequency variations) and/or by translations (spatial variations) of the kernel.

Moreover, in image encoding, the two-dimensional decomposition of a block of pixels into a base of discrete functions forming vectors of this base is separable horizontally and vertically. Consequently, the kernel from which the base is constructed can be considered as the combination of a horizontal one-dimensional kernel and a vertical one-dimensional kernel for the formation of horizontal "parts of vectors" and vertical "parts of vectors".

Furthermore, in the remainder of the description, the term "projection" will be used, notably in expressions such as "horizontal projection one-dimensional kernel", "vertical projection one-dimensional kernel" or "projection of order . . . ".

Indeed, in image encoding, when the two-dimensional decomposition of a block of NP pixels is accomplished within a base of NP discrete functions forming vectors of this base, the NP coefficients obtained from this decomposition are in fact the result of projections (in the mathematical sense of the term) of the block of NP pixels on each of the vectors of the base of NP discrete functions.

Consequently, in light of the foregoing, speaking of horizontal or vertical projections amounts to speaking of horizontal or vertical one-dimensional decompositions (as in the patent application published as number US 2004/136602, for example), or again of filtering operations in the horizontal or vertical direction (as in the patent application published as number EP 0 817 494, for example). In fact, it can be seen that various terminologies, borrowed from the fields of signal processing, encoding and applied mathematics are commonly used to designate the same operations.

More specifically, the operations which will be designated in the remainder of the description by the concept of projections of order $\log_p(P)$ or $\log_n(N)$ are clearly decomposition operations with $\log_p(P)$ or $\log_n(N)$ level(s) of resolution (terminology of US 2004/136602), or alternatively correspond to $\log_p(P)$ or $\log_n(N)$ consecutive filtering operations (terminology of EP 0 817 494). Several methods of block-encoding operating using the abovementioned principle are commonly used, such as notably encoding by DCT ("Discrete Cosine Transform") or by decomposition into a base of wavelets.

Encoding by DCT, used in the JPEG and MPEG standards, is generally applied to square blocks of 8×8 pixels, and is then envisaged as a two-dimensional decomposition of each of these blocks into a base of 64 discrete sinusoidal functions with infinite support. The one-dimensional kernel of the order 1 vertical and horizontal projections accomplished by this encoding technique is a discrete cosine function over 8 pixels, such that k=l=1. Thus, by this DCT encoding, the image signal is decomposed in the frequencies space.

Encoding by decomposition into a base of wavelets with finite support, used in the JPEG 2000 standard, is also generally applied to square blocks of 8×8 pixels. A one-dimensional kernel of vertical and horizontal projections commonly used is a 2-pixel Haar kernel (i.e. the traditional Haar mother square-wave function). By application of this kernel horizontally and vertically, a first decomposition of an 8×8 block into four 4×4 blocks is accomplished. Then, in a second order, the 4×4 sub-block of the low frequencies is decomposed into four 2×2 sub-blocks. Finally, in a third order, the 2×2 sub-block of the low frequencies is decomposed into four pixels, one of which represents the continuous component of the block.

Other decomposition principles, for example into frequency sub-bands, are also conceivable. Their goal is to decorrelate the initial image in order to facilitate, subsequently, its encoding with or without loss, notably through the use of entropic codes.

Such encoding methods using blocks are sometimes implemented in digital image-capture devices such as CMOS sensors, a typical optical module of which is represented in FIG. 1.

In this figure, an optical module 10 of a sensor, for example a CMOS sensor, includes an optical unit 12 and a matrix 14 of sensitive elements, the photodiodes, which, associated with unrepresented electrical reading means, form pixels of an image to be captured.

The matrix of pixels 14 is associated with a sequencing device 16 and with an analog/digital conversion device 18, allowing the acquisition of a digital raster image of pixels. The matrix of pixels 14, the sequencing device 16 and the analog/digital conversion device 18 form, with an interface 20 for transmission of the acquired digital images, an electronic circuit 22 generally called an "imaging circuit" or "focal plane" of the CMOS sensor.

The interface 20 of the imaging circuit 22 is, moreover, generally connected by an electronic physical link 24 to the interface 26 for reception of digital images of a graphical coprocessor circuit 28 which allows algorithms to be implemented to improve the quality of the acquired digital images, and possibly to implement a method of block-encoding such as one of those mentioned above.

The image acquisition devices intended for the consumer market, such as digital cameras or digital video cameras with CMOS sensor, or the optical modules of mobile telephones, are subject to many constraints.

In particular, the transmission rate of the electronic physical link 24 between the imaging circuit 22 and the graphical coprocessor 28 is limited. As an example, the SMIA protocol adopted by very many imaging circuits restricts the transmission rate to 400 Mbits/s. And an uncompressed video of a 2-megapixel imaging circuit, each of which is encoded over 10 bits at 30 images per second requires a transmission rate of 600 Mbits/s. This transmission rate constraint is one of the reasons for which video mode resolution is generally limited.

Moreover, the reduction of electrical power consumption is a major constraint for roaming devices, including image sensors. As one of the largest sources of consumption of these image sensors is the transfer of the digital data between the imaging circuit 22 and the graphical coprocessor circuit 28 through the electronic physical link 24, the best way of reducing this consumption proves to be to reduce the quantity of transmitted data.

Finally, the latest generations of image enhancement filters which can be integrated into the graphical coprocessor circuit 28 require that several successive images are stored. For economic reasons relating to the costs of memory, and due to the increasing quantity of raw information of the images, these algorithms cannot yet be used in low-cost devices.

The abovementioned three constraints show the need for an efficient method for image-encoding allowing a satisfactory compression of acquired digital data to be envisaged, which can be installed either in the graphical coprocessor circuit 28 to allow the use of complex filtering algorithms to be envisaged or, preferentially, in the imaging circuit to limit the transmission rate transmitted by the electronic physical link 24.

In addition, it should be noted that the increase in spatial resolution of an image capture device, quantified by the number of megapixels of its imaging circuit, is now the main innovation criterion for consumers. Due to the cost of integrated circuits and the desire to miniaturise the optical modules, it is therefore necessary to reduce the size of the imaging circuits. The consequence of this is that every installation of an encoding algorithm in an imaging circuit or in a graphical coprocessor circuit is very greatly constrained in terms of complexity.

The document "A CMOS image sensor for focal plane decomposition", by Zhiqiang Lin et al, IEEE International Symposium on Circuits And Systems, vol. 5, pages 5322-5325, May 2005, describes a method for block-encoding envisaging parallel processing of the values of pixels acquired in the imaging circuit of a CMOS sensor which therefore does not have the memory requirements of the traditional methods for encoding by transformation into wavelets.

Conversely, it requires substantial size and complexity of pixels to accomplish this parallel processing, something which is difficult to reconcile with the requirements of miniaturisation of the products intended for the consumer market.

The document "Focal-plane spatially oversampling CMOS image compression sensor", by Ashkan Olyaei et al., IEEE Transactions on Circuits and Systems I, vol. 54, no 1, pages 26-34, January 2007, also describes a block-encoding method accomplished in the imaging circuit. The envisaged two-dimensional kernels vary from 2×2 pixels to 8×8 pixels and the presented method requires that the values of all the pixels of a block are recorded before it is decomposed.

Moreover, none of the methods described in the abovementioned documents really takes into account the specific features of the consumer market CMOS sensors, which implement, in the sequencing device 16, a method of sequential reading of the values of the pixels of an image, in a line-by-line electronic shutter mode, from the first line to the last line of the image. This method of reading by successive electronic shutterings of the lines is intended notably to compensate the lack of sensitivity of low-cost CMOS sensors.

But the electronic constraints, of size, of consumption and the need to provide a video mode also require that the imaging circuits operate in this read mode. This in turn implies that a digital image is by necessity read line-by-line, and that the pixels of two different lines are not chronologically consistent, since they do not represent exactly the same instant of a scene.

A consequence of this operating mode is that the various lines are not completely mutually correlated, whereas the encoding principles mentioned above presuppose an identical horizontal and vertical consistency of the digital images to which they are applied. Moreover, to accomplish block-encoding, for example of 8×8 pixel size, of an image, all the necessary lines must be acquired sequentially and stored before undertaking the processing. Due to the generally limited memory in an imaging circuit this constraint poses a problem.

It may thus be desired to envisage an encoding method which enables the abovementioned problems and constraints to be overcome.

An object of the invention is therefore a method for block-encoding of a raster image of pixels consisting of multiple separate blocks, including a step of successive two-dimensional decompositions of the blocks of this image in a base of discrete functions predetermined using a combined application of a one-dimensional kernel for vertical decomposition of n pixels and of a one-dimensional kernel for horizontal decomposition of p pixels, where the horizontal direction of the blocks is defined as being that of the lines of the raster image in a line-by-line sequential read mode and/or transmission mode of the raster image, wherein:

the horizontal dimension P as a number of pixels of each block is determined as being a multiple of p, $P=k \cdot p$, and a decomposition at $\log_p(P)$ levels of resolution is accomplished using the one-dimensional horizontal decomposition kernel, the vertical dimension N as a number of pixels of each block is determined as being a multiple of n, $N=l \cdot n$, and a decomposition at $\log_n(N)$ levels of resolution is accomplished using the one-dimensional vertical decomposition kernel, and wherein, for given values of n and p, the values of k and l are chosen such that the vertical dimension N is strictly less than the horizontal dimension P.

By limiting the number of lines of the blocks relative to the number of columns, the greater consistency of the pixels on a given line relative to the pixels of a given column, in a line-by-line sequential acquisition of the values of the pixels, is correctly taken into account. This method is therefore advantageously implemented in inexpensive image capture devices able to be used by a wide range of consumers. Moreover, by limiting the number of lines more than the number of columns of a block, the memory of a device implementing this method is used less, and it is easier to envisage installing this method in the imaging circuit.

Optionally, $n=p=2$, and the one-dimensional horizontal and vertical decomposition kernels are discrete Haar functions for decomposition into wavelets. In this case a very simple implementation of an encoding method according to the invention is possible, using adders and subtracters.

Also optionally, the two-dimensional decomposition of the blocks of the raster image includes the combination of a vertical decomposition with 1 level of resolution and of a horizontal decomposition with $\log_2(k)+1$ level(s) of resolution in relation to blocks of vertical dimension $N=2$ pixels and horizontal dimension $P=2 \cdot k$ pixels. In this case, the memory of a device implementing this method is used very little.

Also optionally, since each block consists of k square, successive, separate sub-blocks of four pixels each, the two-dimensional decomposition of any of the blocks of the raster image includes a transformation of each of its k sub-blocks by means of a two-dimensional Haar kernel combining the one-dimensional vertical and horizontal decomposition kernels, followed by a horizontal decomposition with $\log_2(k)$ levels of resolution using the one-dimensional horizontal decomposition kernel applied to k high-entropy components obtained by the transformation of the k sub-blocks.

As another option, an encoding method according to the invention can further include the following steps:
following the step of successive two-dimensional decompositions of the blocks of the image, supply of a first sequence of binary data consisting of words for transcoding, and
entropic transcoding of the first sequence of binary data into a second compressed sequence of binary data through the use of a predetermined entropic code involving a variable-length of the encoded words in order to transcode each word of the first sequence of binary data into a transcoded word,
and, on the basis of a predetermined number, noted B, of low-order bits considered as representative of a noise level of the words of the first sequence of binary data, it can include the application of the following steps to each word of the first sequence of binary data:
subdivision of the word into first and second subwords, where the first subword includes the B low-order bits of the word, and the second subword includes the other high-order bits of the word,
application of the predetermined entropic code to the second subword in order to obtain a second transcoded subword, and
obtaining the said transcoded word by concatenation of the first subword and of the second transcoded subword.

Also optionally, an encoding method according to the invention can also include a step of sequential reading of values of the pixels of the image, line-by-line, from the first line to the last line of the image and, during the reading of N successive lines including at least one block of N lines and P columns, the two-dimensional decomposition of the said at least one block is executed.

Also optionally, an encoding method according to the invention can also include, during the reading of the N successive lines, the following steps:
reading and recording of the successive first N−1 lines,
during acquisition of the Nth line, execution of the two-dimensional decomposition of the said at least one block of this line.

Another object of the invention is an image capture device including means for sequential reading of values of the pixels of an image, line-by-line, from the first line to the last line of the image, and encoding means designed for the execution of the steps of an encoding method as defined above.

Optionally, an image capture device according to the invention can include an imaging circuit, for the capture of images and the analog/digital conversion of these captured images, and a coprocessor circuit different from the imaging circuit and connected electronically to the latter for digital processing of the captured images, wherein the encoding means are integrated into the imaging circuit.

This image capture device is, for example, a digital camera, a digital video camera, or a mobile telecommunication device or data-processing device of some kind fitted with such an integrated camera or video camera.

Finally, another object of the invention is a computer program which can be downloaded from a communication network and/or recorded on a computer-readable medium and/or which can be executed by a processor, including program code instructions for the execution of the steps of an encoding method as described above, when the said program is executed on a computer.

Figure 4:
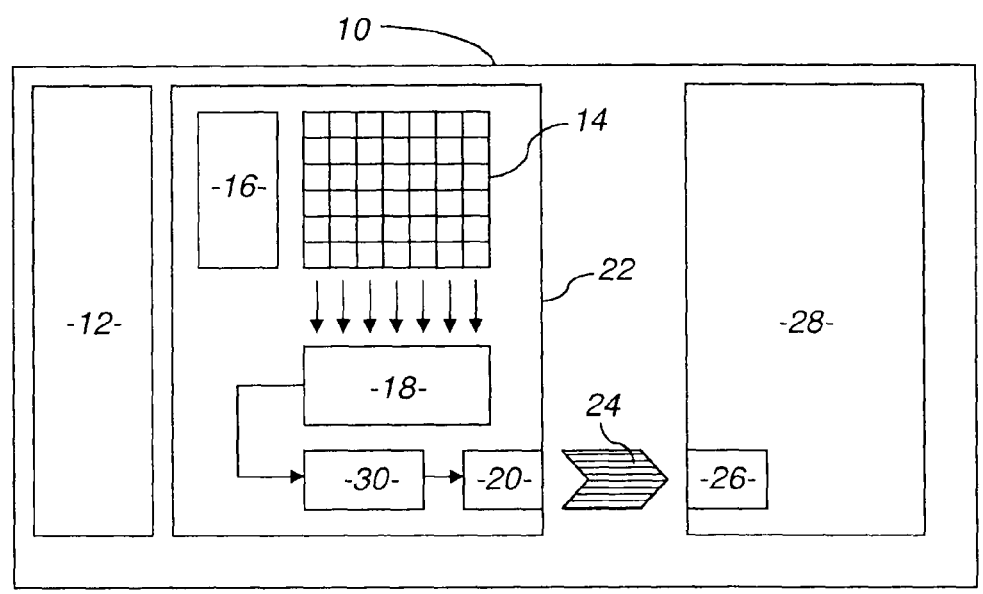
Figure 2:
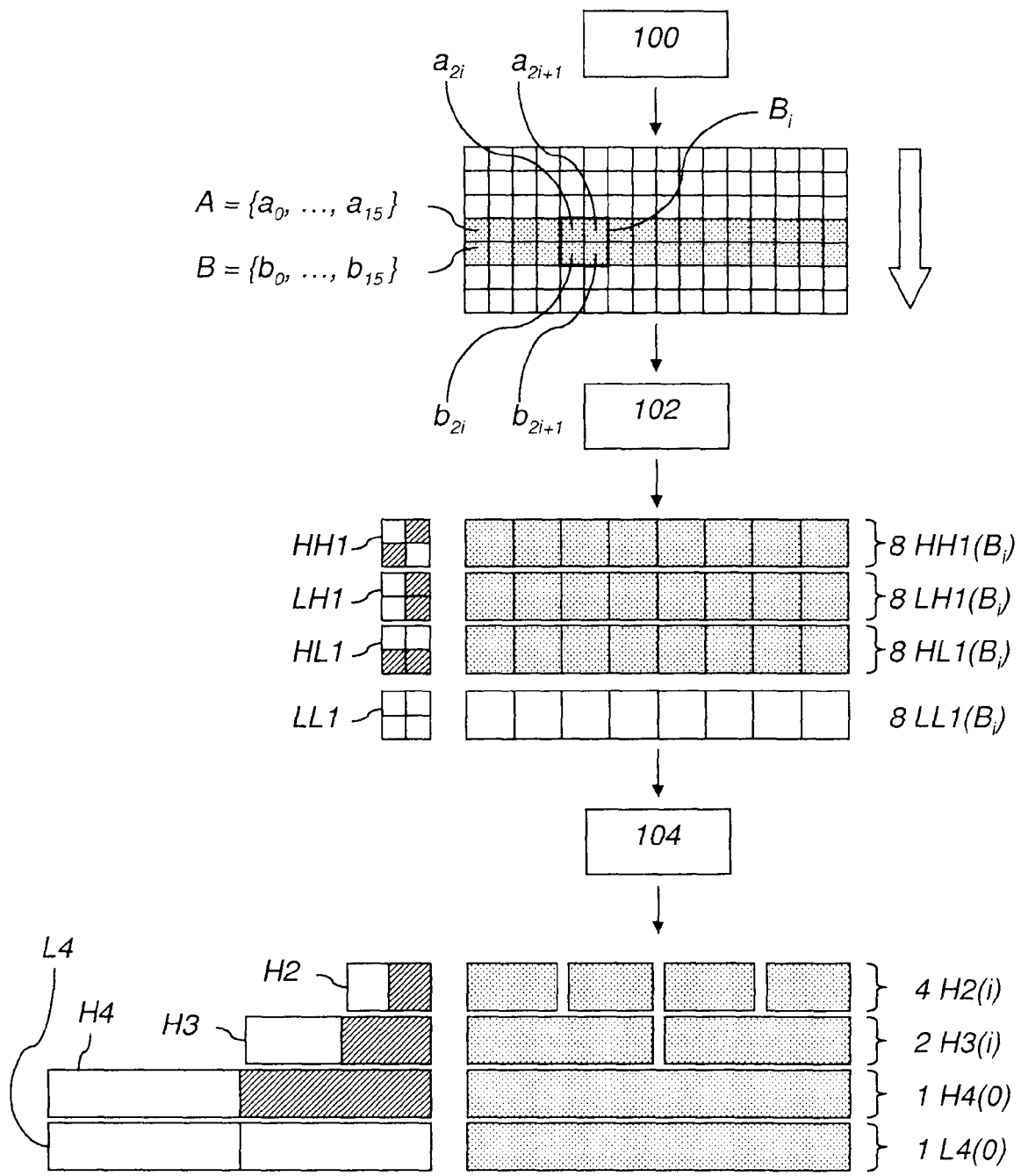
Figure 3:
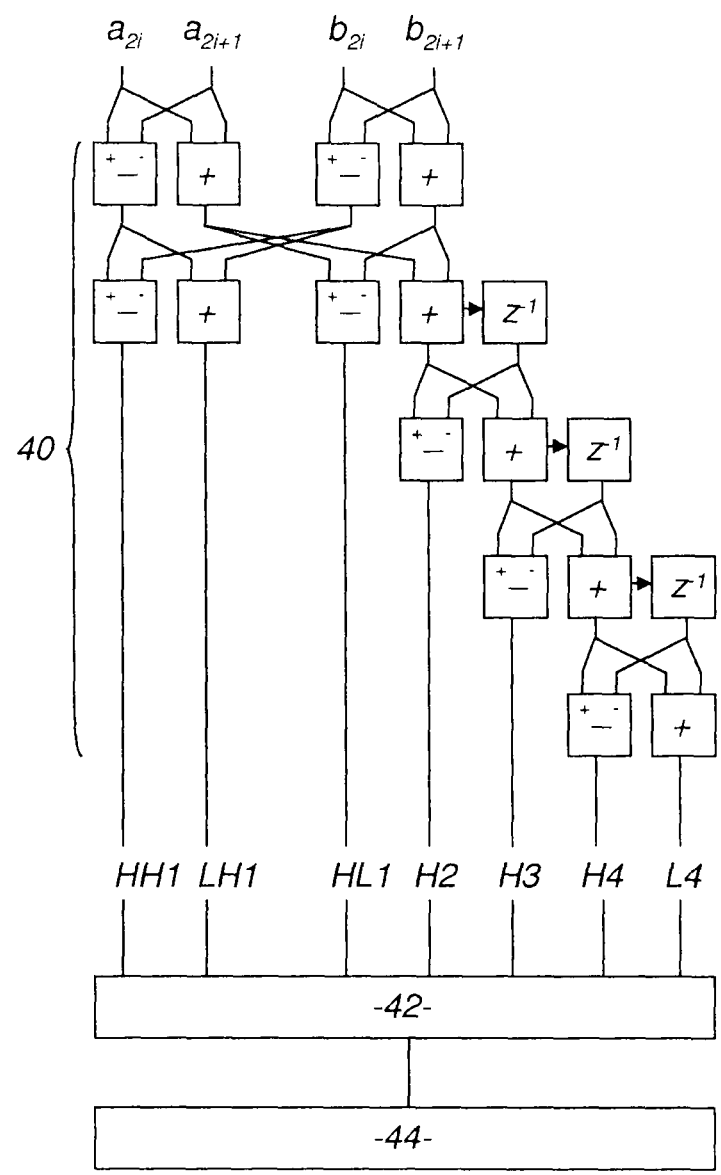
Figure 5:
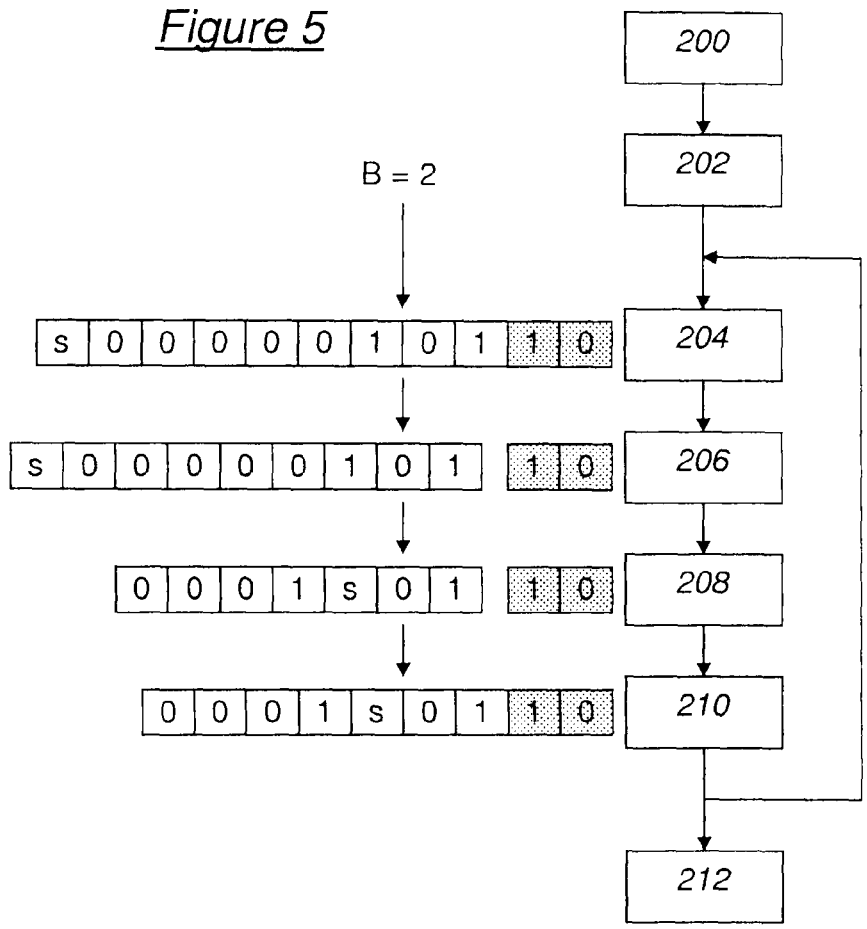
Figure 6:
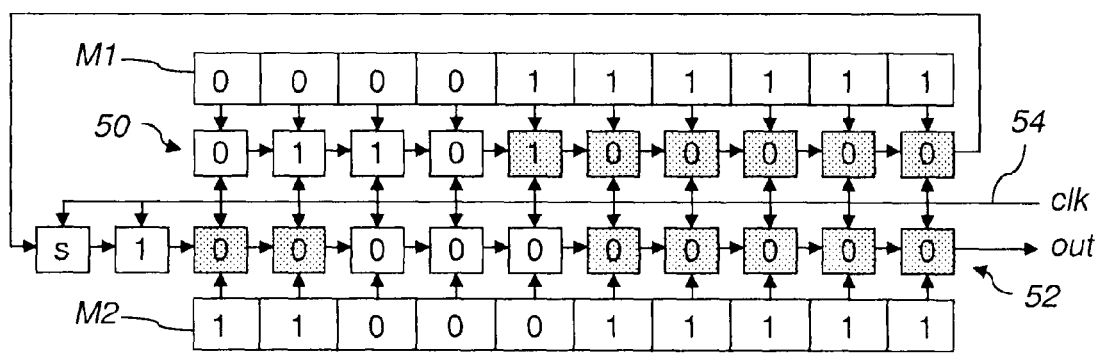

The invention will be better understood by means of the following description, given solely as an example, and made in reference to the appended illustrations, in which:

FIG. 1, previously described, represents diagrammatically the general structure of a state-of-the-art optical image capturing module, FIG. 2 illustrates the successive steps of a method for block-encoding according to an embodiment of the invention, FIG. 3 illustrates an example of installation of the method of FIG. 2 using adders and subtracters, FIG. 4 represents diagrammatically the general structure of an optical image capturing module according to an embodiment of the invention, FIG. 5 illustrates an example of a transcoding method which can be implemented by an encoding device according to the invention, and FIG. 6 illustrates an example of installation of the method of FIG. 5 using shift registers, According to a first aspect of the invention, a new method for source encoding of a raster image of pixels is firstly proposed. According to a second aspect of the invention, an entropic code is then proposed. It is advantageously applied to a sequence of binary data consisting of words including a value of the parameters obtained by the source encoding.

First Aspect: Source Encoding by Decomposition within a Predetermined Base of Discrete Functions The encoding method which will now be described in detail relates to an image acquired by a capture device applying a method of sequential reading of the values of the pixels of this image line-by-line, for example in line-by-line electronic shutter mode, from the first line to the last line of the image. Even in a mechanical shutter mode of the complete matrix of pixels, provided the values of the pixels continue to be read sequentially and line-by-line, this method is also particularly suitable.

To adapt the encoding to the line-by-line sequential read mode the image is subdivided into separate rectangular-shaped blocks the vertical dimension of which is strictly less than the horizontal dimension. The horizontal direction of the image and of the blocks comprising it is defined as being that of the lines of the image in the chosen line-by-line sequential read mode. As a result, the vertical direction of the image and of the blocks comprising it is defined as being that of the columns of the image.

More specifically, in the non-restrictive example illustrated in FIG. 2, the horizontal dimension P in number of pixels of each block is set at 16, and the vertical dimension N in number of pixels of each block is set at 2. Each block thus comprises 32 pixels divided over two successive lines.

The two-dimensional decomposition of such a block is accomplished in a base of discrete Haar wavelets. According to this base, the one-dimensional vertical and horizontal projection kernels each comprises n=p=2 pixels, as is well-known. A Haar wavelets base is chosen because the installation of such a decomposition can be accomplished simply using adders and subtracters, as will be demonstrated below and with reference to FIG. 3.

Thus, according to this example, a projection of order $\log_2(2)=1$ is accomplished vertically in each column of 2 pixels of the block. This order-1 projection consists in adding the 2 pixels in order to obtain a first low-frequency or high-entropy parameter and in subtracting them to obtain a second high-frequency or low-entropy parameter.

According to this example, also, a projection of order $\log_2 (16)=4$ is accomplished horizontally in each line of 16 pixels of the block. This order-4 projection consists in:

adding the 16 pixels of the line in question two-by-two in order to obtain 8 first low-frequency or high-entropy order-1 parameters, and in subtracting them two-by-two in order to obtain 8 second high-frequency or low-entropy order-1 parameters, adding the 8 low-frequency (or high-entropy) order-1 parameters two-by-two in order to obtain 4 first low-frequency or high-entropy order-2 parameters and in subtracting them two-by-two in order to obtain 4 second high-frequency or low-entropy order-2 parameters, adding the 4 low-frequency (or high-entropy) order-2 parameters two-by-two in order to obtain 2 first low-frequency or high-entropy order-3 parameters and in subtracting them two-by-two in order to obtain 2 second high-frequency or low-entropy order-3 parameters, and adding the 2 low-frequency (or high-entropy) order-3 parameters in order to obtain a first low-frequency or high-entropy order-4 parameter and in subtracting them in order to obtain a second high-frequency or low-entropy order-4 parameter.

In equivalent fashion, according to this example, the vertical projection and the first order of the horizontal projection can be accomplished simultaneously in the form of a two-dimensional projection using a two-dimensional Haar kernel, by considering each block of 2×16 pixels as being constituted of 8 square, successive, separate sub-blocks of 2×2 pixels each. Such a projection generates a low-frequency or high-entropy parameter, and three high-frequency or low-entropy parameters per sub-block.

After this, an order-3 horizontal projection is applied to the 8 low-frequency (or high-entropy) parameters obtained.

More specifically, in the course of a first step of reading 100, the imaging circuit 22 reads sequentially a first line A, for example in line-by-line electronic shutter mode. The values of the pixels of this line are then recorded. The number of pixels in the first line A is advantageously 16 or a multiple of 16, i.e. a multiple of the horizontal dimension of a block.

After this, the imaging circuit 22 reads sequentially a second line B, for example in line-by-line electronic shutter mode.

During the reading of this second line B, a step 102 is commenced of accomplishment of a two-dimension projection on to each block of the set of both read lines A and B. In the example illustrated in FIG. 2, for the sake of simplification only, each line is considered as comprising 16 pixels: in other words, in this example which is particularly simple, but which can be extended more generally, the set of both lines A and B comprises a single block. The pixels of line A are noted $a_0, \ldots, a_{15}$ and the pixels of line B are noted $b_0, \ldots, b_{15}$.

This block of 32 pixels $a_0, \ldots a_{15}$ and $b_0, \ldots, b_{15}$ may be considered to be constituted of 8 square sub-blocks noted $B_i$ ($0 \leq i \leq 7$). Each of these square sub-blocks $B_i$ comprises four pixels $a_{2i}, a_{2i+1}, b_{2i}$ and $b_{2i+1}$.

In the course of step 102 each square sub-block $B_i$ is projected in a base consisting of four Haar blocks noted respectively LL1, HL1, LH1 and HH1. These four blocks are represented in FIG. 2 by square blocks of four hatched (subtracted values) or white (added values) pixels shown for reference in the left part of the illustration of step 102, opposite the coefficients they generate.

The first Haar block LL1 represents a low-frequency component element. Bearing in mind the general properties of the images, which in fact essentially consist of mutually differing uniform zones separated by local contours, this low-frequency component element is also a high-entropy parameter. Its projection coefficient is obtained by the following calculation:

$$LL1(B_i)=a_{2i}+a_{2i+1}+b_{2i}+b_{2i+1}.$$

The second Haar block HL1 represents a high-frequency component element or, more specifically, one which is high-frequency vertically and low-frequency horizontally. Bearing in mind the general properties of the images, which in fact essentially consist of mutually differing uniform zones separated by local contours, this high-frequency component element is also a low-entropy parameter. Its projection coefficient is obtained by the following calculation:

$$HL1(B_i)=a_{2i}+b_{2i}+b_{2i+1}.$$

The third Haar block LH1 represents a high-frequency and low-entropy component element or, more specifically, one which is high-frequency horizontally and low-frequency vertically. Its projection coefficient is obtained by the following calculation:

$$LH1(B_i)=a_{2i}+a_{2i+1}-b_{2i}-b_{2i+1}.$$

The fourth Haar block HH1 represents a high-frequency and low-entropy component element or, more specifically, one which is high-frequency horizontally and high-frequency vertically. Its projection coefficient is obtained by the following calculation:

$$HH1(B_i)=a_{2i}-a_{2i+1}-b_{2i}+b_{2i+1}1.$$

The projection of all the B, square sub-blocks in the base of the abovementioned Haar blocks provides 4×8=32 coefficients. The 24 high-frequency and low-entropy coefficients are preserved (8 $HL1(B_i)$ coefficients, 8 $LH1(B_i)$ coefficients, 8 $HH1(B_i)$ coefficients), whereas the 8 low-frequency and high-entropy coefficients $LL1(B_i)$ are not preserved but are processed in the course of a step 104 for production of an order-3 horizontal projection. In the illustration of step 102 of FIG. 2, the preserved coefficients are represented in grey whereas the non-preserved coefficients are represented in white.

In the course of step 104, with a first order, each pair of coefficients $\{LL1 (B_{2i}); LL1 (B_{2i+1})\}$ is projected in a base consisting of two Haar one-dimensional blocks noted respectively L2 and H2. Only block H2 is represented in FIG. 2 by a rectangular block of two "pixels" positioned horizontally, one of which is white (added value) and the other of which is hatched (subtracted value). This H2 block is shown for reference in the left part of the illustration of step 104, opposite the coefficients which it generates and which are preserved. Since the coefficients generated by block L2 are not preserved but processed in a second order of the horizontal projection, they are not represented, and nor is block L2, for the sake of simplifying the illustration of step 104.

The first one-dimensional Haar block L2 represents a low-frequency, high-entropy component element. Its projection coefficient is obtained by the following calculation:

$$L2(i)=LL1(B_{2i})+LL1(B_{2i+1}).$$

The second one-dimensional Haar block H2 represents a high-frequency, low-entropy component element. Its projection coefficient is obtained by the following calculation:

$$H2(i)=LL1(B_{2i})-LL1(B_{2i+1})$$

The projection of the four pairs of coefficients {LL1 ($B_{2i}$); LL1 ($B_{2i+1}$)} in the base of the abovementioned one-dimensional Haar blocks provides 8 coefficients. The 4 high-frequency and low-entropy coefficients are preserved (4 H2($i$) coefficients), whereas the 4 low-frequency and high-entropy L2($i$) coefficients are processed in a second order of the horizontal projection. In the illustration of FIG. 2, the preserved coefficients are represented in grey whereas the non-preserved coefficients are not represented.

In the second order of the horizontal projection, each pair of coefficients {L2 (2$i$); L2 (2$i$+1)} is projected in a base consisting of 2 one-dimensional Haar blocks noted respectively L3 and H3, identical to L2 and H2 but operating at a double scale. Only block H3 is represented in FIG. 2 by a rectangular block of two "pixels" shown horizontally, one of which is white (added value) and the other of which is hatched (subtracted value). This block H3 is shown for reference in the left part of the illustration of step 104, opposite the coefficients which it generates and which are preserved. Since the coefficients generated by block L3 are not preserved but processed in a third order of the horizontal projection, they are not represented, and nor is block L3, for the sake of simplifying the illustration of step 104.

The first one-dimensional Haar block L3 represents a low-frequency, high-entropy component element. Its projection coefficient is obtained by the following calculation:

$$L3(i)=L2(2i)+L2(2i+1).$$

The second one-dimensional Haar block H3 represents a high-frequency, low-entropy component element. Its projection coefficient is obtained by the following calculation:

$$H3(i)=L2(2i)-L2(2i+1).$$

The projection of both pairs of coefficients {L2 (2$i$); L2 (2$i$+1)} in the base of the abovementioned one-dimensional Haar blocks provides 4 coefficients. Both the high-frequency and low-entropy coefficients are preserved (2 H3($i$) coefficients), whereas the 2 low-frequency and high-entropy L3($i$) coefficients are processed in a third order of the horizontal projection. In the illustration of FIG. 2, the preserved coefficients are represented in grey whereas the non-preserved coefficients are not represented.

In the third order of the horizontal projection, both the L3(0) and L3(1) coefficients are projected in a base consisting of two one-dimensional Haar blocks noted respectively L4 and H4, identical to L3 and H3 but operating at a double scale. Block H4 is represented in FIG. 2 by a rectangular block of two "pixels" positioned horizontally, one of which is white (added value) and the other of which is hatched (subtracted value). This H4 block is shown for reference in the left part of the illustration of step 104, opposite the coefficient which it generates and which is preserved. Block L4 is represented in FIG. 2 by a rectangular block of two white "pixels" positioned horizontally (added values). This block L4 is shown for reference in the left part of the illustration of step 104, opposite the coefficient which it generates and which is preserved.

The first one-dimensional Haar block L4 represents a low-frequency, high-entropy component element. Its projection coefficient is obtained by the following calculation:

$$L4(0)=L3(0)+L3(1).$$

The second one-dimensional Haar block H4 represents a high-frequency, low-entropy component element. Its projection coefficient is obtained by the following calculation:

$$H4(0)=L3(0)-L3(1).$$

The projection of both L3(0) and L3(1) coefficients in the base of the abovementioned one-dimensional Haar blocks provides 2 coefficients H4(0) and L4(0). Both these coefficients are preserved and represented in grey in FIG. 2.

In conclusion, 8 HH1($B_i$) coefficients, 8 LH1($B_i$) coefficients, 8 HL1($B_i$) coefficients, 4 H2($i$) coefficients, 2 H3($i$) coefficients, 1 H4(0) coefficient and 1 L4(0) coefficient, i.e. 32 coefficients, are preserved. A reversible transformation has thus been accomplished, forming a lossless encoding which provides a single high-entropy coefficient, coefficient L4(0) which represents the average of the pixels of the block in question.

FIG. 3 illustrates an example of possible architecture to implement the method described above.

A first stage 40 of the proposed architecture includes adders, represented by "+" symbols, subtracters, represented by "−" symbols and memory elements, each of which is the size of a single coefficient, and represented by "$z^{-1}$" symbols. This first stage 40 accomplishes steps 102, 104 as described above and provides, at output, and as the pixels of line B are read, the HH1($B_i$), LH1($B_i$), HL1($B_i$), H2($i$), H3($i$), H4(0) and L4(0) coefficients (noted HH1, LH1, HL1, H2, H3, H4 and L4 in FIG. 3 and in the remainder of the description, for the sake of simplification).

It will be noted that, in traditional fashion, the data supplied by the adders and subtracters using the "$z^{-1}$" memory elements, i.e. those accomplishing the order-3 horizontal projection, in other words a horizontal Haar transformation over 8 parameters, is also sub-sampled at each order of the transformation, such that there are finally as many coefficients resulting from the two-dimensional decomposition as there are original pixels.

After this, the HH1, LH1, HL1, H2, H3, H4 and L4 coefficients obtained by this two-dimensional decomposition of each block are, if applicable, quantified in a quantification block 42 implementing an encoding with losses.

At the output of this quantification block 42 or directly after stage 40 of source encoding, the coefficients are transcoded using an entropic encoding block 44 accomplishing an optimisation of the size of the sequence of binary data representing the initial image.

More generally, the previously described method can be implemented by a computer program which can be downloaded from a communication network and/or recorded on a computer-readable and/or -executable medium by a processor, including program code instructions for execution of its steps described with references to FIG. 2.

It can be installed in various places of an image capture device, notably in its graphical coprocessor circuit 28, as a compression element allowing the storage of images, or in its imaging circuit 22. As is represented in FIG. 4, it is advantageous to install it in the form of a source encoder 30 in the imaging circuit 22. Indeed, in this case, the transmission rate supported by the electronic physical link 24 is substantially reduced.

In FIG. 4 the source encoder 30 is represented at the output of the analog/digital conversion device 18 just before the transmission interface 20. According to various implementation variants, it can also be implemented in the analog field and be located on the supply side of the analog/digital conversion device 18, or indeed designed as one or more parallel elements located at the foot of the columns of the matrix of pixels 14, before or after the conversion device 18.

It will be noted that the image capture device partially represented in FIG. 4 is, for example, a digital camera, a digital video camera, or a mobile telecommunication device or data-processing device of some kind fitted with such an integrated camera or video camera.

It clearly appears that an encoding method as described above enables benefit to be derived from an image capture device with a line-by-line sequential read mode. It can be easily installed in the imaging circuit 22 of such a device, even if this circuit has limited storage space, since it requires that only a single line is recorded in order to undertake processing by blocks, where each block comprises 2 lines and a larger number of columns.

However, it will be noted that the invention is not restricted to the embodiment described above.

Indeed, more generally, if permitted by the storage space of the imaging circuit 22, the number N of lines of the blocks may be increased for as long as it is possible to record N−1 lines of pixels to accomplish the encoding by blocks. By choosing a number P of columns by blocks always strictly greater than N, the advantage consisting in deriving benefit from an improved horizontal consistency of the pixels relating to the line-by-line sequential read mode is preserved, whilst optimising the use of the memory resources.

Conversely, it is also possible to reduce the vertical dimension of the blocks to a single pixel. In this limit case, the vertical projection is the application of an identity function (0-order projection with a single-pixel, one-dimensional kernel). In this case the vertical consistency of the pixels will no longer be used to compress the image, but even less storage space is used.

Finally, in the previous example, an encoding using Haar wavelets was presented since they involve a simple implementation. But it is possible to envisage other wavelets, or even an encoding by DCT or filtering into sub-bands over rectangular blocks. Indeed, the invention is not limited to an encoding by blocks and by two-dimensional decompositions in a base of discrete functions in particular, but applies to every encoding by blocks using, generally, a two-dimensional decomposition (one which may be separated horizontally and vertically) of each block in a predetermined base of discrete functions.

Second Aspect: Entropic Encoding of the Parameters Derived from the Source Encoding The previously described encoding by blocks transforms N×P pixels of each block into N×P coefficients. Its main purpose, as with every source encoding, is to exploit the spatial redundancy of the pixels in order to transform N×P statistically very random pixels into N×P statistically very predictable coefficients. It was indeed seen in the previous example that among the 32 HH1, LH1, HL1, H2, H3, H4 and L4 coefficients provided by stage 40 of source encoding, only coefficient L4 has a high entropy. This makes compression with or without image loss possible using an entropic encoder.

The goal of an entropic code is to transcode fixed-size coefficients with variable probabilities into digital words of variable sizes: the values of the most probable coefficients are encoded in predetermined fashion over a small number of bits; on the contrary, the values of the least probable coefficients are encoded over a large number of bits.

An example of an entropic encoding method suitable for a source encoding which decorrelates the original signal, and most particularly for a method of encoding by blocks according to the invention, will now be described in detail.

Statistically, the signals resulting from the difference of correlated samples from the real world, such as for example the difference between the successive samples of an image signal, whether video or audio, provide coefficients which are frequently close to zero, and rarer the further they are from zero in absolute value terms. The coefficients derived from a DCT-type block-encoding or an encoding by wavelets of a digital image generally verify this property. Thus, every type of entropic code which attributes a number of bits which is smaller the closer the value of the coefficient for transcoding is to zero is particularly suited to these signals.

By referring once again to FIG. 3, the sequence of binary data supplied by the stage of source encoding 40, or possibly by the quantification block 42, consists of a succession of words, where each word comprises a sign bit and a constant predetermined number of bits to define the value of a corresponding coefficient.

An example of a suitable entropic code to transcode this sequence of binary data is as follows:
  if the value of a word is zero, the entropic code attributes to it a transcoded word of two bits, the first of which is at "1" and the second of which has the value of the sign of the word,
  if the value of a word is non-zero, the position of its highest-order bit at "1" is determined such that the entropic code attributes to it a transcoded word obtained by concatenation of a number of bits at "0" corresponding to the said determined position, of a bit at "1", of the bit of the sign of the word and of the bits of the word of an order lower than its highest-order bit at "1".

In other words, this entropic code consists, for a fixed-size word, in encoding the position of its highest-order bit at "1" and its sign using a variable-size code, and then in concatenating the bits of the word of order lower than this bit at highest-order "1" with the variable-size code.

More tangibly, the principle of this entropic code is provided in the following table, in which S designates the sign bit of the binary word to be transcoded:

| value of coefficient | binary word | transcoded word |
|---|---|---|
| 0 | S000 ... 0000 | 1S |
| +1, −1 | S000 ... 0001 | 01S |
| +2, +3, −2, −3 | S000 ... 001X | 001SX |
| +4, +5, +6, +7, −4, −5, −6, −7 | S000 ... 01XY | 0001SXY |
| more generally | position of the highest-order bit at 1 is n | <n zeros> 1S <(n-1) low-order bits> |

A check is made that, for each transcoded word, the number of "0s" before the first "1" enables the size of the complete transcoded word to be defined. The transcoded words are therefore separable if they are read in series in a sequence of transcoded binary data.

This entropic code results from binary logic operations accomplished on binary words. Accordingly, the skilled man in the art will understand that a variant of this code, consisting in accomplishing complementary binary logic operations on two's complements of the binary words, operates in the same way. Similarly, in the previous example, by convention it was chosen to encode the position of the highest bit at "1" using bits at "0" the number of which is equal to this position. The skilled man in the art will also understand that a variant of this code, consisting in choosing another convention, operates in the same way.

It is therefore possible to define this entropic code as forming part of a family of equivalent entropic codes including the following general steps:
  if a word does not consist of bits all of which are identical, the position of its lowest-order bit, called the reference bit, beyond which all the higher-order bits of the word are identical is determined, such that the entropic code attributes to it a transcoded word obtained by concatenation of a number of bits of a predetermined equal value, where this number corresponds to the said determined position, of a bit at a value complementary to the said predetermined equal value, of a bit defined according to the sign of the word, and of the bits of the word of lower order than its reference bit, if a word consists of bits all of which are identical, the entropic code attributes to it a transcoded word of two bits, the first of which is at the said complementary value, and the second at a value defined according to the sign of the word.

Although particularly suitable for the method of encoding presented according to the first aspect of the invention, this entropic code is, however, not very compatible with the genuine variability of the statistics derived from real images, notably due to the noise present in the low-order bits of the coefficients obtained from unprocessed real images.

In order to improve the performance of the entropic code, a parameter B defining a noise threshold B as a number of low-order bits considered to be drowned in noise, and not therefore verifying the optimum statistics of a decorrelated image signal, is used.

On the basis of this parameter B, a new method is defined of entropic transcoding of a first sequence of binary data consisting of words to be transcoded into a second sequence of binary data compressed by use of the above-mentioned entropic code in order to transcode each word of the first sequence of binary data into a transcoded word. On the basis of the number B of low-order bits considered as representative of a level of noise of the words of the first sequence of binary data, it includes the application of the following steps to each word of the first sequence of binary data:

subdivision of the word into first and second subwords, where the first subword includes the B low-order bits of the word, considered as drowned in noise, and where the second subword includes the other high-order bits of the word, application of the abovementioned entropic code to the second subword in order to obtain a second transcoded subword, and obtaining the final transcoded word by concatenation of the first subword and of the second transcoded subword.

Thus, since the B first low-order bits of each word are considered as not apparently verifying the statistics suited to the application of an entropic code, they are excluded from this encoding, which applies only to a high-order part of the word, in such a way as to optimise the use of the entropic code.

For B=3, application of this improvement to the entropic code mentioned previously as an example gives, tangibly, the following transcoding table, in which the b symbols designate the bits considered to be drowned in noise:

| binary word     | transcoded word |
| --------------- | --------------- |
| S000 ... 000bbb | 1Sbbb           |
| S000 ... 001bbb | 01Sbbb          |
| S000 ... 01Xbbb | 001SXbbb        |
| S000 ... 1XYbbb | 0001SXYbbb      |

This improvement could also be applied in the same way to another entropic code adapted for transcoding of sequences of binary data originating from the decorrelation of a real image, video or audio signal.

In an advantageous but non-obligatory manner, the number B is determined for each sequence of binary data in question, according to statistical parameters of this sequence of data. This makes the transcoding advantageously adaptive. After transcoding of the sequence of binary data, the number B must then be provided with the transcoded sequence of data in order to allow a reverse transformation of the signal.

For example, the number B of low-order bits representative of a level of noise of the words of a sequence of binary data is chosen as being the integer part of the average of the positions of the highest-order bit at "1" of the words of this sequence of binary data.

In complementary binary logic or by convention, B could be chosen as being the integer part of the average of the positions of the highest-order bit at "0" of the words of this sequence of binary data.

Thus, expressed in more general terms, B is chosen as being the integer part of the average of the positions of the reference bit of the words of this sequence of binary data.

In practice, transcoding block 44 may be designed to implement a method such as that illustrated in FIG. 5.

In the course of a first step 200 transcoding block 44 receives, in the form of a first sequence of binary data, a digital image encoded by the stage of source encoding 40 consisting of coefficients which may possibly be quantified by block 42.

In the course of a following step 202, a statistical calculation is made on the words of this first sequence of binary data to determine the value of B as integer part of the average of the positions of the highest-order bit at "1" of these words. Purely as an illustration, B is for example evaluated at 2.

After this, in the course of a following step 204, an iterative loop is started on all the words of the first sequence of binary data in order to transcode each of them. Each of the words consists, for example, of a bit of sign s and of ten bits defining the value of a coefficient. Purely as an illustration, a word "s0000010110" is used as an example.

In the course of a following step 206 this word is divided into two subwords. The first subword comprises the B=2 low-order bits of the word, considered to be drowned in noise, in this case "10". The second subword comprises the other high-order bits of the word and its sign bit s, i.e. "s00000101".

In the course of a following step 208, the previously mentioned entropic code is applied to the second subword. The position of its highest-order bit at "1" is 3, such that the entropic code attributes to it a second transcoded subword obtained by concatenation of three bits at "0", of one bit at "1", of the sign bit s and of the bits of the second subword of order lower than its highest-order bit at "1". This gives the following transcoded second subword: "0001s01".

Finally, in the course of a step 210, a transcoded word corresponding to the word "s0000010110" is obtained by concatenation of the second transcoded subword and of the first subword. This finally gives "0001s0110".

The method is repeated in step 204 until all the words of the first sequence of binary data are transcoded.

A final step 212 is then commenced, to end the transcoding by supplying a second sequence of transcoded binary data, consisting of the words previously transcoded, with the value of B encoded over a predetermined number of bits. The transmission of B and of the second sequence of transcoded binary data is sufficient, indeed, to recover the coefficients of the decorrelated signal.

FIG. 6 illustrates an example of a possible architecture to implement transcoding block 44, when the previously described entropic code is applied.

The proposed architecture includes two shift registers 50 and 52 arranged in series. Each shift register consists of cells including, except for the first, an "in" input linked to an "out" output of the previous cell. In addition, the "in" input of the first cell of the second shift register 52 is linked to the output of the final cell of the first shift register 50.

Each cell of each shift register is further linked to a circuit 54 providing a clock signal which, at each clock stroke k, causes the input of each cell to be transferred to its output using the relationship out (k)=in (k−1), for a sequential reading of the content of registers 50 and 52. Finally, and originally, each cell of each shift register includes an additional control input which enables this cell to be short-circuited when it is, for example, set at "1". In other words, when the short circuit is activated for a cell, out (k)=in (k) and the value carried by this cell is not read.

The particular architecture illustrated in FIG. 6 is suitable for the transcoding of words of ten value bits and one sign bit. It is represented in the particular case of the processing of the word "s0000010110", transcoding of which has been explained previously.

The first shift register 50 comprises as many cells as there are value bits of the word to be processed, i.e. ten cells. They are loaded with the value of the word, with the first cell carrying the lowest-order bit and the last the highest-order bit.

The second shift register 52 comprises two cells more than the first. Its first two cells are loaded respectively with the sign bit of the word and with "1". The following ten are loaded with "0".

In complementary logic or according to the chosen conventions, the values of the cells of the registers will, of course, be modified according to the implemented entropic code variant.

The control inputs of the ten cells of the first shift register 50 are supplied respectively by ten bits of a first short-circuit word M1. The control inputs of the ten cells loaded with "0" of the second shift register 52 are supplied respectively by ten bits of a second short-circuit word M2.

The first and second words M1 and M2 are defined on the basis of the value of B and the position n of the highest bit at "1" of the word to be transcoded.

To accomplish this a first intermediate word Mi1 is defined carrying, in binary format and over ten bits, the value $2^B-1$. For example, if B is equal to 2, Mi1 is equal to "0000000011". A second intermediate word Mi2 is also defined carrying, in binary format and over ten bits, the value $2^n-1$. For example, for the word "s0000010110", n is equal to 5. Mi2 is therefore equal to "0000011111". It will also be noted that Mi2/2 is equal to "0000001111", which corresponds to a shift towards the low-order bits of Mi2.

In practice the second intermediate word Mi2 is obtained very easily from the word to be transcoded. Its highest bit is set to the value of the highest bit of the word to be transcoded and there is an iteration towards the lower-order bits using an OR logical relationship between its bit of rank n and the bit of rank n−1 of the word to be transcoded to define the value of its bit of rank n−1.

The first word M1 is then defined by the following logical relationship:

M1=NOT (Mi2/2 OR Mi1).

In the example illustrated in FIG. 6 this gives:
M1=NOT ("0000001111" OR "0000000011"),
M1=NOT ("0000001111"),
M1="1111110000".

The second word M2 is defined by the following logical relationship:

M2=(NOT Mi2) OR Mi1.

In the example illustrated in FIG. 6 this gives:
M2=(NOT "0000011111") OR "0000000011",
M2="1111100000" OR "0000000011",
M2="1111100011".

In FIG. 6, the words M1 and M2 are represented from left to right in the ascending direction of the order of their bits. Whenever they have a bit at "1", they short circuit the corresponding cell, which is then represented in grey. Since the values of the grey cells are not transmitted by both shift registers in series, it can be seen, moving back up the cells from the last cell of the second register 52 to the first cell of the first register 50, that the transcoded word supplied sequentially at the output from the second shift register 52 takes, in this example, the value "0001s0110".

It clearly appears that the improved method of transcoding through use of an entropic code such as the one previously described remains efficient even in the presence of sequences of binary data carrying decorrelated but noisy values.

When, in addition, the value of B is calculated automatically from statistical data extracted from sequences of binary data, this makes this transcoding method adaptive, which is particularly advantageous. Since parameter B is intended to take quite a low value (i.e. it quantifies a level of noise as a number of bits which are apparently drowned in noise), it can also itself be encoded over a small number of bits, for example three. The additional cost of the adaptive property of the transcoding method is therefore negligible. It will also be noted that the value of B may be determined out of hand, without resulting from a particular statistical calculation.

Finally, it is important to note that the second aspect of the invention described in detail in reference to FIGS. 5 and 6 advantageously applies to a method of encoding by blocks according to the invention, notably to the embodiment described in reference to FIGS. 1 to 4 (first aspect of the invention).

But the skilled man in the art will note that the second aspect of the invention is independent of the first since it is possible to implement it without providing it at the input with data which is necessarily encoded by a method according to the first aspect of the invention. It could equally apply advantageously to other methods for encoding by blocks, for example those described in the state of the art, the purpose of which is to decorrelate an image, video or audio signal which is initially highly correlated.

Conversely, the encoding method described according to the first aspect of the invention does not necessarily include this transcoding method. It can equally well use a known transcoding method.

The invention claimed is:

1. A method for block-encoding of a raster image of pixels of multiple separate blocks, comprising:
   successive two-dimensional decompositioning of the blocks of the image in a base of discrete functions predetermined using a combined application of a one-dimensional kernel for vertical decomposition of n pixels and a one-dimensional kernel for horizontal decomposition of p pixels, wherein the horizontal direction of the blocks is defined as that of lines of the raster image in a line-by-line sequential read mode and/or transmission mode of the raster image;
   wherein the horizontal dimension P as a number of pixels of each block is determined as a multiple of p, P=k·p, and a decomposition at $\log_p(P)$ level(s) of resolution is accomplished using the one-dimensional horizontal decomposition kernel; and
   wherein the vertical dimension N as a number of pixels of each block is determined as a multiple of n, N=l·n, and a decomposition at $\log_n(N)$ level(s) of resolution is accomplished using the one-dimensional vertical decomposition kernel, and for given values of n and p, the values of k and l are chosen such that the vertical dimension N is strictly less than the horizontal dimension P.

2. An encoding method according to claim 1, wherein n=p=2, the one-dimensional kernels of horizontal and vertical decompositions being discrete Haar functions for a decomposition into wavelets.

3. An encoding method according to claim 2, wherein the two-dimensional decomposition of the blocks of the raster image includes the combination of a vertical decomposition with 1 level of resolution and of a horizontal decomposition with $\log_2(k)+1$ level(s) of resolution in relation to blocks of vertical dimension N=2 pixels and horizontal dimension P=2·k pixels.

4. An encoding method according to claim 3, wherein each block is of k square, and successive, separate sub-blocks of four pixels each, the two-dimensional decomposition of any of the blocks of the raster image includes a transformation of each of its k sub-blocks by a two-dimensional Haar kernel combining the one-dimensional vertical and horizontal decomposition kernels, followed by a horizontal decomposition with $\log_2(k)$ levels of resolution using the one-dimensional horizontal decomposition kernel applied to k high-entropy components obtained by the transformation of the k sub-blocks.

5. An encoding method according to claim 1, further comprising:

following the successive two-dimensional decompositions of the blocks of the image, supplying a first sequence of binary data of words for transcoding, and entropic transcoding of the first sequence of binary data into a second compressed sequence of binary data through use of a predetermined entropic code involving a variable-length of the encoded words to transcode each word of the first sequence of binary data into a transcoded word, and wherein, on basis of a predetermined number B, of low-order bits considered as representative of a noise level of the words of the first sequence of binary data, wherein application of the following to each word of the first sequence of binary data:

subdivision of the word into first and second subwords, wherein the first subword comprises the B low-order bits of the word, and the second subword comprises the other high-order bits of the word, application of the predetermined entropic code to the second subword to obtain a second transcoded subword, and obtaining the transcoded word by concatenation of the first subword and of the second transcoded subword.

6. An encoding method according to claim 1, further comprising sequential reading of values of the pixels of the image, line-by-line, from a first line to a last line of the image and wherein, during the reading of N successive lines including at least one block of N lines and P columns, the two-dimensional decomposition of the at least one block is executed.

7. An encoding method according to claim 6, further comprising, during the reading of the N successive lines:

reading and recording of the successive first N−1 lines; and during acquisition of the Nth line, execution of the two-dimensional decomposition of the at least one block of this line.

8. An image capture device comprising:

means for sequential reading of values of the pixels of an image line-by-line from a first line to a last line of the image; and encoding means for execution of the encoding method according to claim 6.

9. An image capture device according to claim 8, further comprising an imaging circuit, for capture of images and the analog/digital conversion of the captured images, and a coprocessor circuit different from the imaging circuit and connected electronically to the imaging circuit for digital processing of the captured images, wherein the encoding means is integrated into the imaging circuit.

10. A non-transitory computer readable medium including computer executable instructions downloadable from a communication network and/or recorded on a medium readable by computer and/or executable by a processor, comprising computer executable code instructions for execution of the encoding method according to claim 1 when the computer executable code instructions are executed on a computer.

* * * * *